(12) United States Patent
Schoor et al.

(10) Patent No.: US 9,958,543 B2
(45) Date of Patent: May 1, 2018

(54) APPARATUS AND METHOD FOR DETERMINING THE ELEVATION ANGLE IN A RADAR SYSTEM

(71) Applicant: Robert Bosch GmbH, Stuttgart (DE)

(72) Inventors: Michael Schoor, Stuttgart (DE); Volker Gross, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 357 days.

(21) Appl. No.: 14/442,658

(22) PCT Filed: Sep. 25, 2013

(86) PCT No.: PCT/EP2013/069918
§ 371 (c)(1),
(2) Date: May 13, 2015

(87) PCT Pub. No.: WO2014/075839
PCT Pub. Date: May 22, 2014

(65) Prior Publication Data
US 2016/0282464 A1    Sep. 29, 2016

(30) Foreign Application Priority Data
Nov. 14, 2012   (DE) .................. 10 2012 220 773

(51) Int. Cl.
G01S 13/93     (2006.01)
G01S 3/14      (2006.01)
(Continued)

(52) U.S. Cl.
CPC ............ G01S 13/931 (2013.01); G01S 3/143 (2013.01); G01S 13/4445 (2013.01);
(Continued)

(58) Field of Classification Search
CPC ............... G01S 13/931; G01S 13/4445; G01S 13/4454; G01S 2013/9375; G01S 3/14–3/143; H01Q 21/296
See application file for complete search history.

(56) References Cited

U.S. PATENT DOCUMENTS 5,008,678 A * 4/1991 Herman .................. G01S 7/032
                                                    342/158
5,325,097 A   6/1994 Zhang et al.
(Continued)

FOREIGN PATENT DOCUMENTS

CN    101334475 A    12/2008
CN    102279381 A    12/2011
(Continued)

*Primary Examiner* — Matthew M Barker
(74) *Attorney, Agent, or Firm* — Norton Rose Fulbright US LLP; Gerard Messina

(57) ABSTRACT

The present method and system relates to the determination of elevation angles for the case in which more than one target object is situated within a radar cell. Through the estimation according to the present invention of the elevation angles in multi-target scenarios, even in such cases both azimuth angles and elevation angles can be determined, and a reliable classification of the respective target objects can then take place. The present system also relates to a motor vehicle having a radar system that includes an azimuth and elevation angle estimation method and system.

14 Claims, 2 Drawing Sheets

(51) Int. Cl.
*G01S 13/44* (2006.01)
*H01Q 21/29* (2006.01)
*G01S 3/36* (2006.01)

(52) U.S. Cl.
CPC ....... *G01S 13/4454* (2013.01); *H01Q 21/296* (2013.01); *G01S 3/36* (2013.01); *G01S 2013/9375* (2013.01)

(56) References Cited

U.S. PATENT DOCUMENTS

| | | | | |
|---|---|---|---|---|
| 5,361,072 A | * | 11/1994 | Barrick | G01S 7/35 342/133 |
| 2007/0063889 A1 | * | 3/2007 | Hulbert | G01S 3/74 342/140 |
| 2008/0266171 A1 | | 10/2008 | Weber et al. | |
| 2012/0112953 A1 | | 5/2012 | Grau et al. | |

FOREIGN PATENT DOCUMENTS

| | | |
|---|---|---|
| CN | 102707258 A | 10/2012 |
| DE | 10 2010 064348 | 7/2012 |
| JP | 2011186584 A | 9/2011 |
| WO | 2006/094510 | 9/2006 |
| WO | 2010003656 A1 | 1/2010 |

\* cited by examiner

APPARATUS AND METHOD FOR DETERMINING THE ELEVATION ANGLE IN A RADAR SYSTEM

FIELD OF THE INVENTION

The present invention relates to a device and to a method for determining the elevation angle in a radar system. In particular, the present invention relates to a device and to a method for determining the elevation angle when there is a plurality of targets within a radar cell.

BACKGROUND INFORMATION

Modern vehicles are increasingly equipped with so-called driver assistance systems that support the driver of a motor vehicle, for example when driving the vehicle in moving traffic, and also for example when parking the vehicle along the side of a roadway.

In the processing carried out by a driver assistance system, it is desirable to distinguish between those objects that can be driven over safely by the motor vehicle (for example empty beverage containers lying on the ground) and those objects that must not be driven over by the vehicle (for example a parking car or a tree). Here, it is helpful to determine, in addition to the azimuthal angular position of a detected object, the elevation angle as well, i.e. the vertical position of the object.

German patent application DE 10 2010 064 348 A describes a radar sensor for motor vehicles. The configuration of the antennas here can be controlled in such a way that it has a directional characteristic that varies with time. By evaluating radar echoes, an elevation angle of detected objects can be determined.

One possibility for determining an elevation angle is to supplement a radar sensor system with an additional elevation antenna. This elevation antenna has a directional characteristic that differs, in the elevation direction, from the characteristic of the antennas of the main system. If the amplitudes of the received signals originating from a transmit pulse of the elevation antenna are compared with the amplitudes of those signals originating from a transmit pulse of the main antennas, from this comparison of the amplitudes it is possible to infer an elevation angle of an object. The taking into account of the amplitudes can be directed either to the analysis of the magnitude of the amplitudes, or alternatively can evaluate the complex amplitudes as to their magnitude and phase.

However, if more than one object is simultaneously located in the sector of a radar cell, then in this case it is no longer possible to make an unambiguous determination of the elevation angle from the comparison of the amplitudes of the received signals.

Therefore, there is a need for a radar system that, when more than one object is situated within a radar cell, is capable of reliably determining an elevation angle. In addition, there is also a need for a radar system that, when more than one object is situated within a radar segment, enables a reliable classification of the objects.

SUMMARY OF THE INVENTION

According to an aspect, the present invention creates a device for elevation angle determination, having a transceiver unit for sending out and receiving radar signals; a device for determining azimuthal target parameters that is configured to determine a number of detected targets and to determine an azimuth angle for each detected target; and a device for elevation angle determination that is configured to form a control matrix based on the azimuthal target parameters and to determine an elevation angle for each detected target, using the control matrix.

It is an aspect of the present invention to determine for each detected target a separate elevation angle, based on a determined number of detected targets and the azimuth angle assigned to each target. The determination of the elevation angles takes place using the least squares approach. For this purpose, a suitable control matrix is formed that corresponds to the system response of the radar system in the azimuth directions of the detected targets. Based on this control matrix, the amplitude ratios of the received signals are determined, and the elevation angles of the targets are determined therefrom in a simple manner.

An advantage of the present invention is that no additional transceiver hardware, in the form of additional antenna elements or signal generators, is required for the determination of the elevation angles according to the present invention. The approach according to the present invention for determining the elevation angles can be realized using the already-existing transceiver hardware.

A further advantage of the present invention is that the elevation angles can be correctly estimated even within a single radar cell when there is the occurrence of a plurality of objects. In this way, from this information further inferences can be made for a reliable classification.

In a specific embodiment, the transceiver unit includes a signal producing device, a main antenna, and an elevation antenna. The elevation antenna may have a directional characteristic that differs from the main antenna. Through a comparison of the received signals, originating on the one hand from the transmit pulses of the main antenna and from the transmit impulses from the elevation antenna on the other hand, in this way a simple and reliable determination of elevation angles can take place. In an alternative specific embodiment, the main antenna and elevation antenna have the same directional characteristic, but have different phase centers.

In a specific embodiment, the transceiver unit sends out a multiplicity of signals via the main antenna, and in addition sends out at least one signal via the elevation antenna, the signal sent out via the elevation antenna corresponding to one of the signals sent out via the main antenna. Thus, at least one identical signal is sent out both via the main antenna and the elevation antenna. This enables a simple comparison of the amplitudes in the respective received signals. In this way, it is particularly easy to make inferences concerning the respective elevation angles.

In a specific embodiment, the control matrix is formed from parameters of antenna diagrams. In particular, the control matrix may be formed from the parameters in the sectional planes of the previously determined azimuth angles of the targets, through the antenna diagrams of the antennas used. Such a control matrix thus reproduces the directional characteristic of the radar system in the direction of the detected targets.

According to a specific embodiment, the device for determining the elevation angle additionally includes a storage device for storing predetermined relationships between signal ratios and elevation angles. In this way, it is possible ahead of time to calculate a respective elevation angle for the amplitude ratios in question, and to store these relationships in a table. Thus, the high computing expense required during operation is avoided, and the determination of the elevation angle can be carried out particularly quickly.

According to a specific embodiment, the radar signal is an FMCW (frequency-modulated continuous wave) radar signal. Such radar systems are particularly well-suited for the determination of distance and speed.

A specific embodiment includes a motor vehicle having a radar system that includes a device according to the present invention for elevation angle determining.

According to a specific embodiment, the method for elevation angle determination also includes a step of inversion of the control matrix. Through such an inversion, in a simple manner a system of equations can be created and solved that expresses the system relationships for the determination of the elevation angle.

According to a further specific embodiment, the method for elevation angle determination also includes a step of classification of the detected targets. The step of classification may include distinguishing between targets over which a motor vehicle can drive and targets over which a motor vehicle cannot drive. Such a classification can be reliably carried out by the optimized elevation angle determination according to the present invention, and enables a driver assistance system having improved input parameters.

Although the present invention is described with reference to a radar system in vehicles, the present invention is not limited thereto.

DETAILED DESCRIPTION

Figure 1:
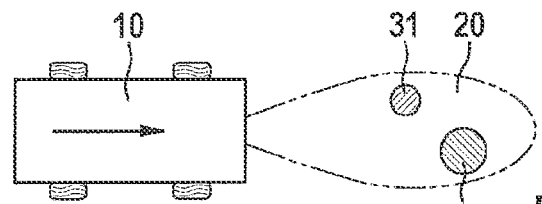
FIG. 1 shows a schematic representation of a top view of a two-target scenario.

The directional terminology used hereinafter, i.e. terms such as "left," "right," "top," "bottom," "front," "rear," and the like, are used only for the better understanding of the drawings. In no case do they represent a limitation of generality. The drawings shown in the Figures are in part perspective drawings, and, for reasons of clarity, are not necessarily to scale. The depicted components and elements, as well as the configurations shown, may vary according to the deliberations of someone skilled in the art, and may be adapted to the respective application. In general, identical reference characters designate components that are of the same type or have the same function.

In the sense of the present invention, radar systems are all types of systems that send out a signal and receive a portion of this transmitted signal reflected by the environment, and that then draw inferences concerning the surrounding environment based on the relationships between the transmitted signal and the received signal. Such systems send out electromagnetic radiation. The signals that are sent out can be both short pulsed signals and also signals that are sent out over a longer period of time. The signals can vary over time, intensity, and/or frequency. In particular, radar systems in the sense of the present invention include so-called FMCW radar systems. Such systems send out a continuous signal over a specified period of time, and the frequency of the signal is varied over time. Through suitable variations of the signal frequency, further inferences can be made concerning the number, the position, and the relative speed of the targets that are to be detected.

FIG. 1 schematically shows a sample top view of a scenario in which a plurality of objects 31, 32 are situated within a radar cell 20. For example, a motor vehicle 10 can be present here in which a radar system according to the present invention is installed. As an example, a radar cell 20 is shown, directed outward to the right from depicted motor vehicle 10. Two targets 31 and 32 are situated within this radar cell 20. Target 31 can for example be an empty beverage container lying on the ground, or the like. A motor vehicle could drive over such an object without risk. The other target object 32 can for example be a parking motor vehicle or a tree. In the case of such an object, impact with a motor vehicle is to be avoided.

Although here, as in the following, a radar cell having two target objects is always considered, the present invention can in principle also be carried out when there are three or more target objects within a radar cell. The consideration of only two target objects within a radar cell is provided here only for better understanding, and does not represent a limitation of the present invention.

Figure 2:
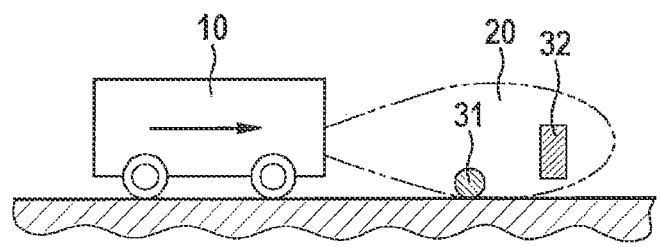
FIG. 2 shows a schematic representation of a side view of a two-target scenario.

FIG. 2 shows a schematic representation of a side view of the scenario of FIG. 1. As can be seen in this Figure, the two objects 31 and 32 are at different heights, but they are both situated in the same radar cell 20, which is illuminated by the radar system.

Figure 3:
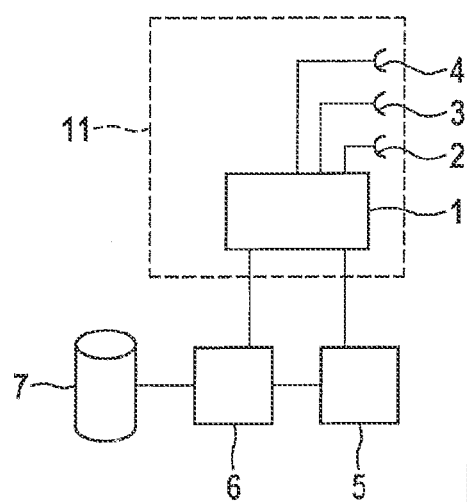
FIG. 3 shows a schematic representation of a device for elevation angle determination according to a specific embodiment of the present invention.

FIG. 3 shows the schematic configuration of a radar system for detecting target objects. Here, the radar system includes a transceiver unit 11. Inside this transceiver unit 11, first one or more radar signals are produced and are sent out via a main antenna 3. The emitted electromagnetic waves meet target objects 31, 32 and are reflected by these target objects 31, 32. A part of the reflected electromagnetic radiation is thereupon received by receive antenna 2 and is prepared by signal processing unit 1.

For a resolution of a plurality of targets in the azimuth direction, signal processing unit 1 can generate a plurality of different types of signals. For example, in the case of an FMCW radar, signals can be produced in which the frequency increases or decreases in linear fashion over time. In this way, through a plurality of such signals having a different frequency increase or decrease, an unambiguous distinguishing of a plurality of targets is possible.

Through the application of suitable methods, in the case of FMCW radar systems in particular an unambiguous determination of distance, relative speed, and azimuth angle can take place even when there is a plurality of target objects 31, 32 within a radar cell 20.

In addition, the resolution of a plurality of targets inside a radar cell 20 can also be improved through the use of a receive antenna 2 having more than one receive channel. For an unambiguous resolution of a plurality of targets, here the number of receive channels in the radar system must exceed the number of targets to be detected. Otherwise, a determination of the angular position of the target objects is not possible.

In order to determine an elevation angle of a target inside a radar cell, in addition a further elevation antenna 4 additionally sends out a signal that is likewise reflected by a target object. The reflection of this signal is also acquired by receive antenna 2 and forwarded. If main antenna 3 and elevation antenna 4 have a different orientation, so that the main directions of radiation of these two antennas differ, then, as a function of the vertical position of a target object, the ratio of the amplitudes of the respective receive signals from main antenna 3 and elevation antenna 4 will vary. Through the analysis of this amplitude ratio, an elevation angle can then be determined for the target object. The evaluation of the amplitude ratios can be based on a complete analysis of the complex amplitudes; i.e., the analysis takes place with regard both to magnitude and to phase. Alternatively, the analysis can also take place taking into account only the amplitude magnitudes.

For this purpose, however, the signal sent out via elevation antenna 4 may correspond to a signal that was also sent out in the same form via main antenna 3, so that it is possible to directly compare the signal amplitudes.

However, the above-described determination of the elevation angle is successful only if only one target object is situated in a radar cell. Otherwise, in this way it is not possible to make a usable inference concerning an elevation angle.

In order to arrive at a correct determination of the respective elevation angle even in the case of a plurality of target objects inside a radar cell, in this case first the parameters of the target objects in the azimuth direction must be determined. For this purpose, device 5 for determining azimuthal target parameters first determines a number n of detected targets, and for each of these detected targets determines an associated azimuth angle θ. In addition, in this context it is also possible to determine further parameters, such as distances of the target objects and relative speed.

If the number n of targets and their azimuth angles $\theta_n$ are known, then a so-called control matrix A can be formed therefrom:

$$A=[a(\theta_1),a(\theta_2),\ldots,a(\theta_n)]$$

The size of this control matrix A is a function of the number n of detected targets. For each detected target, control matrix A has a respective column. The individual columns of this control matrix are formed respectively by control vectors a(θ). These control vectors a(θ) are determined from the parameters of the antenna diagrams, as a function of the respective azimuth angle θ for the individual targets. From an incident signal s, according to control matrix A there therefore theoretically results a received signal x, through:

$$x=A\cdot s$$

Based on this equation, the amplitudes of the individual incident signals can now be estimated as follows:

$$\hat{s}=A'\cdot x$$

where ŝ is the estimation of the amplitudes of the signals, x is the received signal, and A' is the pseudo-inverse in control matrix A. In this way, based on this equation the amplitudes of the individual incident signals can be estimated.

In order to determine the elevation angle when there is more than one target object inside the radar segment, device 6 for elevation angle determination therefore first creates a control matrix A, using the previously determined azimuthal target parameters for this purpose. A pseudo-inverse matrix A' of this control matrix is then formed. This can take place for example using the Moore-Penrose method. The amplitudes of the incident signals in the respective azimuth directions can then be estimated by multiplying pseudo-inverse control matrix A' by a vector x from the received signals. After the estimation ŝ is present for the respective signal amplitudes, the ratio of the amplitudes between the signal of main antenna 3 and the signal of elevation antenna 4 can be determined. From amplitude ratio ŝ of the signals determined in this way, an estimation of the elevation angle can then be made for each individual target.

In order not to have to carry out the complex computing operations for the determination of the elevation angle from the amplitude ratio anew every time, a table can be created ahead of time by storing the relationship between the amplitude ratio and the elevation angle resulting therefrom in table form. Such a table can be stored for example in a storage device 7. Device 6 for determining the elevation angle accesses storage device 7 as needed, and can then immediately determine the respective elevation angle without further complex computing operations.

In the same way, a control matrix A can be inverted ahead of time, and one or more inverted control matrices can likewise be stored in suitable form. For example, these inverted control matrices can be stored in a further storage area of storage device 7. As needed, a suitable inverted control matrix can then be read out from this storage device 7, and can be used for a fast determination of the elevation angle estimation.

In this way, in particular for very time-critical applications, as required for example in real-time evaluation during travel of a motor vehicle, a fast determination of elevation angles is possible when there is more than one target object.

In the above-described exemplary embodiment, the elevation angle determination was carried out by creation of a control matrix, and subsequent inversion of this control matrix. In addition, in the approach according to the present invention other methods are also possible that are based on describing the system behavior of the radar system in a control matrix, and subsequently calculating an elevation angle estimation based on the determined system behavior.

Through the estimation carried out in this way of the elevation angle when there is more than one target inside a radar cell, it is possible to precisely classify the target objects even when there is more than one target object in a radar cell. In particular, it is possible to distinguish between objects lying on the ground, over which a motor vehicle can drive without risk, and on the other hand to reliably recognize those objects with which a motor vehicle must not be permitted to collide. Such a reliable classification therefore also enables improved configuration of driver assistance systems.

Figure 4:
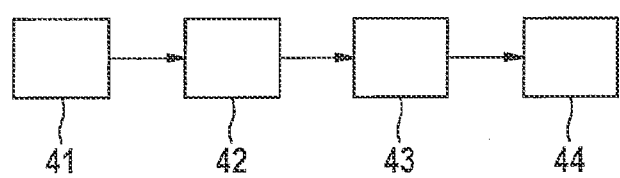
FIG. 4 shows a schematic representation of a method according to a specific embodiment of the present invention.

FIG. 4 shows a method for elevation angle determination in a radar system. In a first step 41, first the azimuthal target parameters are determined. These target parameters are, as described above, on the one hand the number of detected targets, and, in addition, an azimuthal angle estimation for each of the detected targets. Further parameters, such as distance of the target objects and/or relative speed of the target objects to the radar system, can here also be determined.

In a further step 42, a control matrix A is now formed based on these azimuthal target parameters. This control matrix A includes a column, having a corresponding control vector a, for each detected target object. The respective target vector a represents in each case a vector with the system response in the corresponding azimuth direction.

In a further step 43, the pseudo-inverse A' of this control matrix A is then formed. For example, this pseudo-inverse control matrix A' can be determined using the Moore-Penrose method. Alternative methods for determining a pseudo-inverse matrix are of course also possible.

Taking into account the calculated pseudo-inverse control matrix A', in step 44 amplitude relationships ŝ of the incident signals can be determined, and based on the amplitude relationships ŝ determined in this way, the respective elevation angles can be determined for the individual detected target objects.

Alternatively to the formation of a pseudo-inverse, other methods are possible that are based on representing the system behavior of the radar system and carrying out a resolution of this system behavior for an angle estimation of a plurality of target objects.

Based on the azimuth and elevation angles determined in this way for each individual target object, in this way a classification of the individual targets is possible that is clearly better than would be possible without elevation angle determination.

Figure 5:
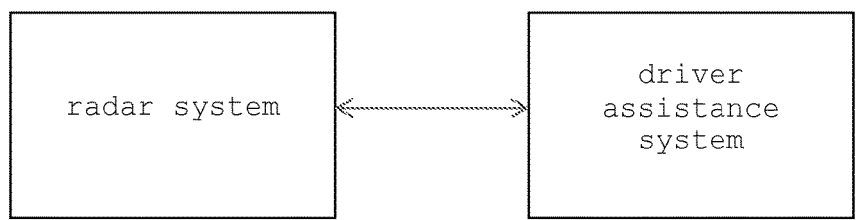
FIG. 5 shows the radar system and a driver assistance system.

FIG. 5 shows the radar system and a driver assistance system.

In particular, through a reliable elevation angle determination, it is possible to distinguish very well between objects lying on the ground and those objects that are at a distance from the ground. For driver assistance systems in particular, it is of decisive importance to be able to carry out a safe and reliable classification of target objects, distinguishing between objects over which a vehicle can drive without risk and those objects over which the vehicle must not drive.

According to the approach of the present invention for elevation angle determination, it is in addition possible to determine the azimuth angle and elevation angle of a plurality of target objects even with only a transmit antenna. For this purpose, first there takes place an azimuthal angle estimation, and subsequently an estimation of the elevation angle.

For the determination of the azimuth angle of the plurality of N target objects, the number of receive channels provided must exceed the number of targets to be detected. That is, for N target objects to be detected, at least N+1 receive channels are required. From the determined signals, a solution for the angle estimations is then calculated, again in the manner according to the present invention.

After the azimuth angles of the targets have subsequently been determined, using a further N+1 receive channels the determination of the elevation angles takes place according to the approach of the present invention, by solving the corresponding equation system. Through this two-step angle estimation method, a particularly efficient azimuth and elevation angle determination can be realized in multi-target scenarios.

In sum, the present invention relates to the determination of elevation angles for the case in which more than one target object 31, 32 is situated inside a radar cell 20. Through the estimation according to the present invention of the elevation angle in multi-target scenarios, even in such cases both azimuth angles and elevation angles can be determined, and a reliable classification of the respective target objects 31, 32 can then take place. In particular, the present invention also relates to a motor vehicle 10 having a radar system that includes an azimuth and elevation angle estimation according to the present invention.

What is claimed is:

1. A device for determining an elevation angle, comprising:
    a transceiver unit for sending and receiving radar signals, the transceiver unit including a signal producing device, a main antenna, and an elevation antenna, each of the main antenna and elevation antenna receiving a respective signal;
    a first device for determining azimuthal target parameters, which is for determining a number of detected targets and for determining an azimuth angle for each detected target; and
    a second device for determining the elevation angle, which is configured for forming a control matrix A based on the azimuthal target parameters, and, using the control matrix A, to determine an elevation angle for each detected target;
    wherein the control matrix A is formed as follows:

$$A=[a(\theta_1),a(\theta_2),\ldots,a(\theta_n)]$$

where:
    n is the number of detected targets,
    $\theta_1,\ldots,\theta_n$ are the azimuth angles of the respective targets, and
    $a(\theta_1), a(\theta_2), \ldots, a(\theta_n)$ are control vectors from parameters of antenna diagrams of the antennas as a function of the respective azimuth angles $\theta_1, \ldots, \theta_n$;
    wherein a respective amplitude of an incident signal is estimated for each of the main antenna and the elevation antenna by the second device using the control matrix A and using the respective signals received by the main antenna and the elevation antenna, and an amplitude ratio is determined using the estimated amplitudes, the elevation angle for each detected target being determined based on the amplitude ratio, the amplitude ratio being a ratio comparing the amplitude of the incident signal estimated for the main antenna and the amplitude of the incident signal estimated for the elevation antenna.

2. The device of claim 1, wherein the transceiver unit is for sending out a plurality of signals via the main antenna, and for sending out at least one signal via the elevation antenna that corresponds to one of the signals sent out via the main antenna.

3. The device of claim 1, wherein the radar signals include FMCW radar signals.

4. The device of claim 1, wherein the second device determines a pseudo-inverse of the control matrix A, wherein each of the amplitudes of incident signals is estimated using the pseudo-inverse of the control matrix A according to ŝ=A'·x, wherein A' is the pseudo-inverse of the control matrix A, and x is a vector of the respective signals received by the main antenna and the elevation antenna.

5. The device of claim 4, wherein the pseudo-inverse of the control matrix A is determined using a Moore-Penrose method.

6. A motor vehicle, comprising:
    a driver assistance system; and
    a radar system including:
    a transceiver unit for sending and receiving radar signals, the transceiver unit including a signal producing device, a main antenna, and an elevation antenna, each of the main antenna and elevation antenna receiving a respective signal;
    a first device for determining azimuthal target parameters, which is for determining a number of detected targets and for determining an azimuth angle for each detected target; and
    a second device for determining the elevation angle, which is configured for forming a control matrix A based on the azimuthal target parameters, and, using the control matrix, to determine an elevation angle for each detected target, wherein the control matrix A is formed as follows:

$$A=[a(\theta_1),a(\theta_2),\ldots,a(\theta_n)]$$

where:

n is the number of detected targets, $\theta_1, \ldots, \theta_n$ are the azimuth angles of the respective targets, and $a(\theta_1), a(\theta_2), \ldots, a(\theta_n)$ are control vectors from parameters of antenna diagrams of the antennas as a function of the respective azimuth angles $\theta_1, \ldots, \theta_n$;

wherein a respective amplitude of an incident signal is estimated for each of the main antenna and the elevation antenna by the second device using the control matrix A and using the respective signals received by the main antenna and the elevation antenna, and an amplitude ratio is determined using the estimated amplitudes, the elevation angle for each detected target being determined based on the amplitude ratio, the amplitude ratio being a ratio comparing the amplitude of the incident signal estimated for the main antenna and the amplitude of the incident signal estimated for the elevation antenna;

wherein the elevation angles are used by the driver assistance system.

7. The motor vehicle of claim 6, wherein the second device determines a pseudo-inverse of the control matrix A, wherein each of the amplitudes of incident signals is estimated using the pseudo-inverse of the control matrix A according to $\hat{s}=A'\cdot x$, wherein A' is the pseudo-inverse of the control matrix A, and x is a vector of the respective signals received by the main antenna and the elevation antenna.

8. The device of claim 7, wherein the pseudo-inverse of the control matrix A is determined using a Moore-Penrose method.

9. A method for determining an elevation angle in a radar system including antennas, the method comprising:

sending and receiving, by a transceiver unit of the radar system, radar signals, the transceiver including a signal producing device, a main antenna, and an elevation antenna, each of the main antenna and the elevation antenna receiving a respective signal;

determining azimuthal target parameters, the azimuthal target parameters including a number of detected targets and an azimuthal angle estimation for each detected target;

forming a control matrix A based on the azimuthal target parameters, wherein the control matrix A is formed as follows:

$$A=[a(\theta_1), a(\theta_2), \ldots, a(\theta_n)]$$

where:

n is the number of detected targets, $\theta_1, \ldots, \theta_n$ are the azimuth angles of the respective targets, and $a(\theta_1), a(\theta_2), \ldots, a(\theta_n)$ are control vectors from parameters of antenna diagrams of the antennas as a function of the respective azimuth angles $\theta_1, \ldots, \theta_n$;

determining the elevation angles of the targets using the control matrix, wherein a respective amplitude of an incident signal is estimated for each of the main antenna and the elevation antenna using the control matrix A and using the respective signals received by the main antenna and the elevation antenna, and an amplitude ratio is determined using the estimated amplitudes, the elevation angle for each detected target being determined based on the amplitude ratio, the amplitude ratio being a ratio comparing the amplitude of the incident signal estimated for the main antenna and the amplitude of the incident signal estimated for the elevation antenna.

10. The method of claim 9, further comprising:
inverting the control matrix.

11. The method of claim 9, further comprising:
classifying the detected targets.

12. The method of claim 9, further comprising:
determining a pseudo-inverse of the control matrix A, wherein each of the amplitudes of incident signals is estimated using the pseudo-inverse of the control matrix A according to $\hat{s}=A'\cdot x$, wherein A' is the pseudo-inverse of the control matrix A, and x is a vector of the respective signals received by the main antenna and the elevation antenna.

13. The method of claim 12, wherein the pseudo-inverse of the control matrix A is determined using a Moore-Penrose method.

14. The method as recited in claim 9, wherein the radar system is in a vehicle, and the method further comprises:
distinguishing between objects using the determined elevation angles in a driver assistance system of the vehicle.

* * * * *